United States Patent [19]
Haskin et al.

[11] 3,746,088
[45] July 17, 1973

[54] APPARATUS FOR USE IN WELLS
[75] Inventors: Charles A. Haskin; Ralph S. Millhone, both of Brea, Calif.
[73] Assignee: Chevron Research Company, San Francisco, Calif.
[22] Filed: Sept. 7, 1971
[21] Appl. No.: 177,933

[52] U.S. Cl. ................... 166/59, 166/300, 166/302, 175/14
[51] Int. Cl. ............................................ E21b 43/24
[58] Field of Search ............................. 175/14, 17; 166/57–59, 260, 270, 274, 300, 302, 313

[56] References Cited
UNITED STATES PATENTS
| | | | |
|---|---|---|---|
| 2,902,270 | 9/1959 | Salomonsson et al. | 166/302 |
| 2,738,162 | 3/1956 | Aitchison | 175/14 |
| 2,890,754 | 6/1959 | Hoffstrom et al. | 166/59 |
| 3,004,603 | 10/1961 | Rogers et al. | 166/59 |
| 3,216,498 | 11/1965 | Palm | 166/59 X |

FOREIGN PATENTS OR APPLICATIONS
| | | | |
|---|---|---|---|
| 1,081,683 | 6/1954 | France | 166/57 |
| 155,732 | 12/1920 | Great Britain | 166/59 |

*Primary Examiner*—David H. Brown
*Attorney*—J. A. Buchanan, Jr.

[57] ABSTRACT

Apparatus for use in mixing reactive fluids in a well to supply heat to the well and including tubing strings providing two flow paths from the earth's surface down the well to a reaction chamber. The reaction chamber has a closed lower end and an upper end connected to the tubing strings. The flow paths extend down to the lower portion of the reaction chamber to provide flow paths for reactive fluids down the chamber to the lower end thereof. Exhaust port means are formed near the upper end of the chamber to permit reaction products to be expelled from the chamber into the well.

5 Claims, 6 Drawing Figures

Patented July 17, 1973

INVENTORS
CHARLES A. HASKIN
RALPH S. MILLHONE
BY Edward J. Keeling
Ralph L. Freeland Jr.
ATTORNEYS

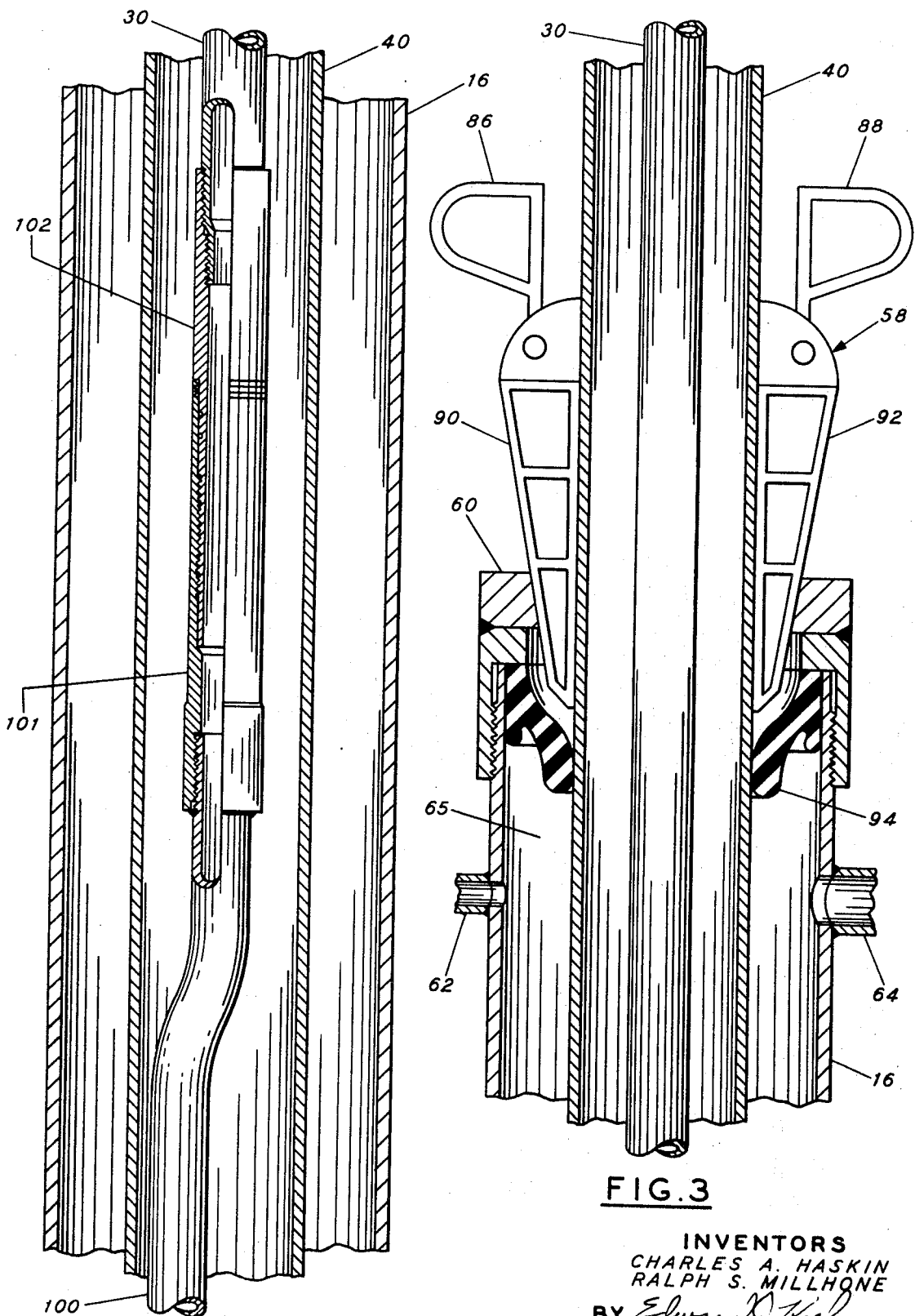

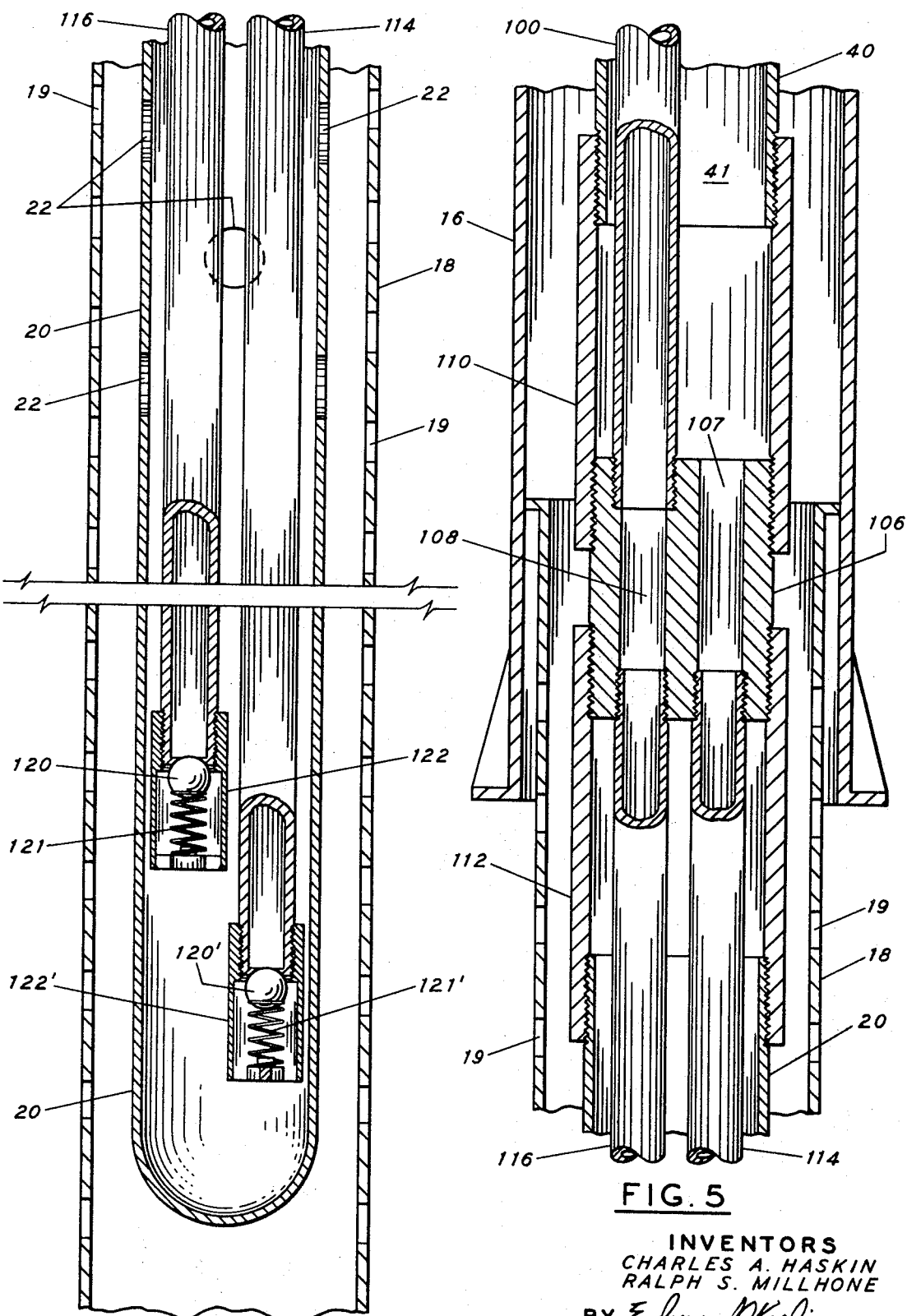

APPARATUS FOR USE IN WELLS

BACKGROUND OF THE INVENTION

The invention relates to apparatus useful in mixing reactive fluids such as hydrazine and hydrogen peroxide together in a well to generate heat therein and, more particularly, the invention is directed to apparatus useful to carry highly reactive fluids down separate flow paths from the earth's surface to the lower end of a reaction chamber located in a well.

It is often desirable to heat a well penetrating an earth formation. For example, heat is often used to improve production from wells. Further, heat may be used for other purposes such as assisting in removing liners from a well. Heretofore, it has been suggested to supply heat by mixing highly reactive chemicals in a well. For example, in U. S. Pat. No. 3,266,572 the use of hypergolic mixtures for improving production from a well are suggested. The present invention is directed to apparatus useful in mixing reactant fluids at a preselected position in a well.

BRIEF DESCRIPTION OF THE PRESENT INVENTION

In a broad aspect the present invention is directed to apparatus for use in mixing reactive fluids in a well to supply heat to the well. Tubing strings provide two flow paths from the earth's surface down the well to a reaction chamber. The reaction chamber has a closed lower end and an upper end connected to the tubing strings. The flow paths extend down to the lower portion of the reaction chamber to provide conduits for reactive fluids down the chamber to the lower end thereof. Exhaust port means formed near the upper end of the chamber to permit reaction products to be expelled from the reaction chamber into the well.

In the preferred form the apparatus of the present invention includes a first tubing means forming a flow path from the earth's surface down a well. A second tubing means is concentrically arranged around the first tubing means and provides a second flow path from the surface down the well. Sources of the fluids which make up the hypergolic mixture are connected to each of the tubing means. A reaction chamber having a closed lower end and an open upper end is connected to the tubing strings. A crossover sub located at the upper end of the reaction chamber is used to change the concentrically arranged flow paths to parallel flow paths. Small diameter tubing sections are located inside the reaction chamber and are connected to the crossover sub to carry the reactive fluids down the interior of the reaction chamber to a location near the bottom end of the reaction chamber. Vent port means are formed in the upper end of the chamber to exhaust the reaction products from the chamber.

OBJECTS OF THE INVENTION

A principal object of the present invention is to provide apparatus for mixing reactive fluids at a desired location in a well.

BRIEF DESCRIPTION OF THE DRAWINGS

FIG. 3 is a sectional elevational view illustrating the tubing hanging slips useful in the present invention.

FIG. 4 is an elevation view, partially in section, and illustrates the crossover connection in accordance with the preferred form of the invention.

FIG. 5 is an elevation view with parts in section and illustrates the connection between the reaction chamber and the concentrically arranged tubing of the preferred form of the invention.

FIG. 6 is an elevation view with portions in section and illustrates the lower portion of the reaction chamber assembled in accordance with the present invention.

DETAILED DESCRIPTION OF THE DRAWINGS

Figures 1, 2:
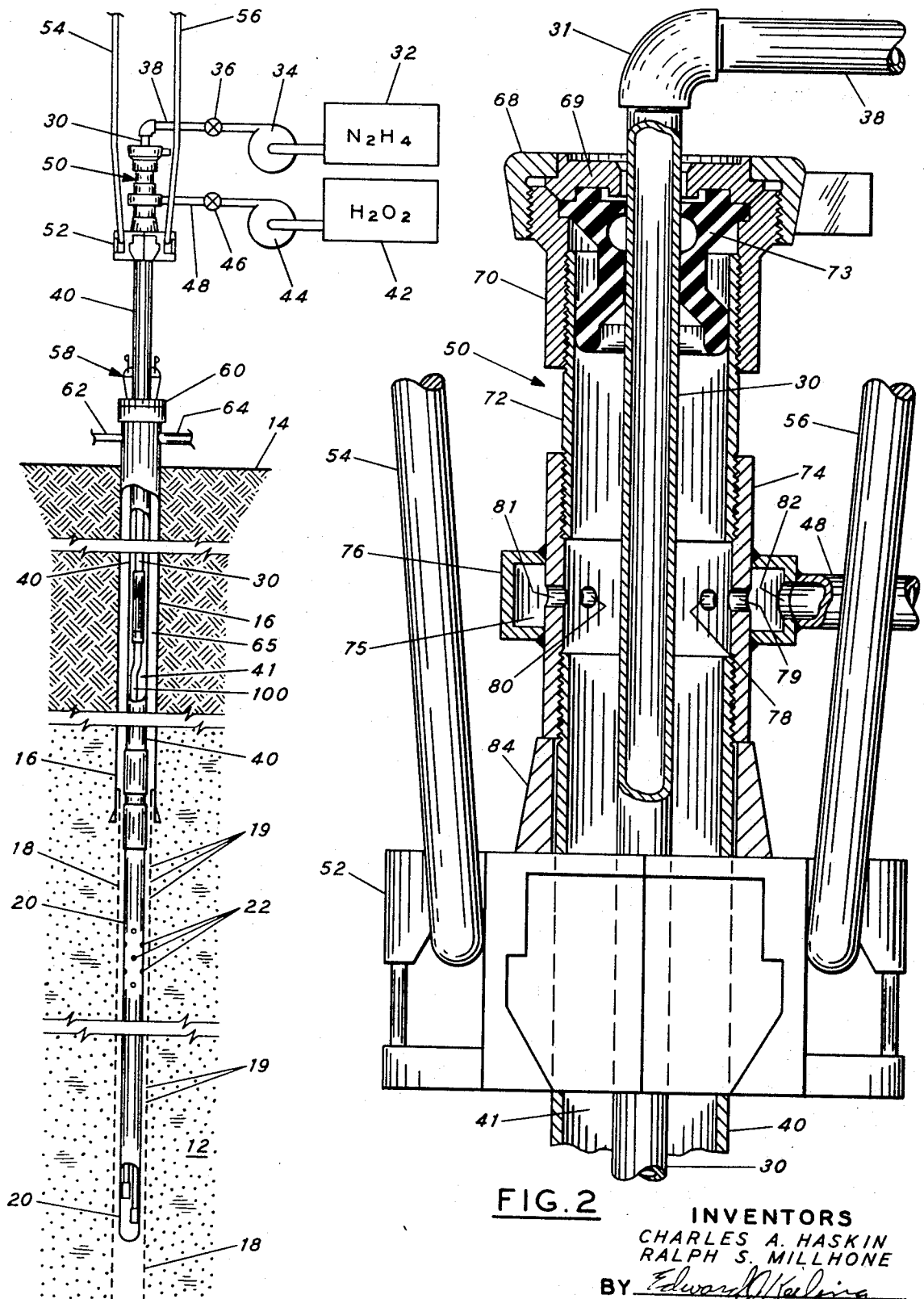
FIG. 1 is an elevation view, partially in section, and shows the preferred form of apparatus assembled in accordance with the present invention.
FIG. 2 is an elevation view with parts in section and illustrates the upper portion of the preferred form of apparatus.

In FIG. 1 a well is shown drilled from the earth's surface 14 into a fluid producing formation 12. The upper portion of the well is cased with a suitable string of casing 16. A production liner 18 having suitable openings 19 is hung from the casing and extends along the producing formation 12. The openings, which may be slots or perforations, permit flow of fluid either into the well from the producing formation or out of the well into the producing formation 12.

Various operational difficulties may arise wherein the use of heat in the well adjacent the liner may become desirable. For example, if it is desired to remove liner 18 from the well, heat may be used to assist in freeing the liner from the well. A method for liner removal using heat and the apparatus for accomplishing it are described and claimed in U.S. Pat. No. 3,565,177, the disclosure of which is herein incorporated by reference. Heat is also often useful to assist in stimulating production of fluids from the formation into the well. The heat by assisting in removing plugging material from the liner and by reducing the viscosity of the oil in the formation adjacent the liner can be beneficial in improving production from the well.

In accordance with the invention, apparatus is used in mixing reactant fluids in a well to permit effective release of heat in the well. An elongated tubular reaction chamber 20 is positioned in the well adjacent liner 18. The reaction chamber 20 has a closed lower end and an open upper end. A first flow path for a reactive fluid is formed from the earth's surface to a position inside of and near the lower closed end of the reaction chamber 20. A second flow path for a second reactive fluid is formed from the earth's surface to a position inside of and adjacent the lower end of the reaction chamber 20. A source of a first reactive fluid is connected to the first flow path at the earth's surface and a source of a second reactive fluid is connected to the second flow path at the earth's surface. The first reactant fluid and the second reactant fluid are flowed to the reaction chamber by means of independent flow paths. The fluids are flowed to the lower end of reaction chamber 20 where they are mixed together and a reaction occurs. Vent ports 22 are formed in the upper portion of the chamber 20 for venting reaction products from the chamber to the well.

In the preferred form of the invention a first tubing string 30 is utilized to form a first flow path from the earth's surface down the well. A source 32 of a first reactant fluid which may be, for example, hydrazine ($N_2H_4$) is connected through a suitable pump 34 and a valve 36 by tubing 38 to the tubing string 30. A second tubing string 40 is concentrically arranged around the first tubing string 30 and the annular space 41 between the tubing strings provides a second flow path from the earth's surface down the well. A source 42 of a second reactant fluid which may be, for example, hydrogen peroxide ($H_2O_2$), is connected to the second flow path 41 through a suitable pump 44 and a valve 46 by tubing 48. A tubing head section indicated generally as 50 provides flow connections between the surface sources and the tubing strings. The tubing head section 50 and the apparatus connected thereto is hung above and in the well by means of elevators 52 and links 54, 56. The links 54, 56 are connected to a traveling block (not shown) on a conventional hoist which is utilized to move the elevators up and down thereby raising or lowering the apparatus of the present invention. Slips 58 are used to hang the exterior tubing string 40 from wellhead 60 if desired. Blooie and kill lines 62 and 64 are provided to vent the annular space 65 between the well casing-liner and tubing string 40-reaction chamber 20. Suitable valves are placed on these lines to control the flow in annulus 65.

Thus in preferred form the present invention provides apparatus for use in mixing fluids in a well which includes a first tubing means forming a flow path from the earth's surface down a well and a second tubing means concentrically arranged around the first tubing means and also extending from the earth's surface down the well. A source of a first reactive fluid is connected to the upper end of the first tubing means. A source of a second reactive fluid is connected to the upper end of the second tubing means. An elongated tubular reaction chamber having a closed lower end and an open upper end is located in the well and is connected to the lower end of the second tubing means. A crossover sub having two openings forming parallel flow paths therethrough is located at the upper end of the reaction chamber and is connected to the first and second tubing strings and acts to change the concentrically arranged flow paths to parallel flow paths. A pair of small diameter flow tubes are connected to the openings in the crossover sub and extending in parallel relationship substantially the entire length of the reaction chamber for flowing the reactive fluids to the bottom of the chamber where mixing occurs. Vent port means are located in the upper portion of the chamber for venting reaction products from the chamber to the well.

FIGS. 2 through 6 are enlarged views of portions of the apparatus shown in FIG. 1 and are useful in showing the preferred embodiment of apparatus of the present invention in greater detail.

FIG. 2 is an elevation view with parts in section for clarity of presentation and illustrates the tubinghead section indicated generally by the number 50 in greater detail. Tubing string 30 provides a first flow path through the interior of tubing head section 50. While it is recognized that a number of segmented tubing sections are connected together to form a tubing string, for sake of ease of description the entire tubing string will be given the number 30. Surface conduit 38 is connected to the upper end of tubing section 30 by suitable means such as an elbow joint 31.

A second flow path concentric to the first flow path is formed between the inside of tubing string 40 and the outside of tubing string 30. This flow path provides a second flow path for fluids from the surface down the well. The tubinghead section 50 closes off the upper portion of the annular chamber 41 between the tubing strings and provides a convenient entry for flow into the annular passageway 41. Thus a cap 68 and collar 69 are threadably connected by sub 70 to a sleeve member 72. A stripper rubber 73 abuts against the collar 69 and the interior wall of sleeve 72 and the exterior wall of tubing string 30 to prevent flow through the top of the cap 68. An intermediate tubular section 74 having an annularly extending channel member 76 connected on its exterior surface is connected to the sleeve 72. The channel member 76 forms an annular chamber 75 around the center portion of the intermediate tubular section 74. A series of holes 78–81 provide communication from the annular chamber 75 to the interior of the intermediate tubular member 74. Conduit 48 is used to connect the source of second fluid to the annular chamber through port 82. Thus fluid can be flowed from a surface source to the annular chamber 41 between tubing strings 40 and 30. The lower portion of the intermediate tubular section 74 is provided with threads to engage tubing section 40. A case member 84 sits on elevators 52 and supports intermediate sleeve 74.

FIG. 3 is a sectional view and illustrates in greater detail the tubing hanging slips 58 and the wellhead 60. The tubing hanging slips 58 are adapted to engage and disengage outer tubing string 40 to hang the tubing string 40 in the well. Handles 86 and 88 are used to engage and disengage jaws 90 and 92 of the slips against tubing string 40. An annularly extending stripper rubber 94 seals off the annular space 65 between the casing 16 and the outer tubing string 40. Flow into and out of the casing-tubing annulus 65 is accomplished through blooie line 64 and kill line 62.

FIG. 4 illustrates the connection between inner tubing string 30 and tubular extension 100 of the reaction chamber. This connecting sub facilitates connecting tubing string 30 into the tubular extension 100 and the reaction chamber after the reaction chamber has been run into the well on the outer tubing string 40. In operation, the reaction chamber is connected to the outer tubing string 40 and is lowered into the well to a predetermined position. The inner tubing string 30 is then lowered inside of the outside tubing string 40 and is connected to extension 100 by means of the tubing connecting sub. Briefly, the connecting sub includes a collar 101 which is threadably engaged on extension 100. The collar 101 has interior square threads in its upper end which are adapted to easily receive similar threads on the outside of sub 102 which is threadably connected to the tubing string 30. The square threads contain O-ring seals to seal the connection.

FIG. 5 is an elevation view with parts in section and illustrates in greater detail the crossover sub used to change the concentric flow paths of the tubing string to the parallel flow paths in the reaction chamber. The crossover sub includes a bulkhead member 106 which has two parallel openings 107 and 108 extending therethrough. The bulkhead member is connected to the outer tubing string 40 by means of collar 110 and is connected to the reaction chamber 20 by means of collar 112. The tubular extension 100 which is connected to the lower end of the upper part of the tubing connection sub and thus to the tubing string 30 is connected to one of the holes 108 in the bulkhead meber 106. The other hole 107 communicates with the annular flow path 41 between the inner tubing string 30-crossover extension 100 and the outer tubular string 40. Two small diameter parallel flow tubes 114 and 116 are connected to the lower end of the holes 107 and 108 of the bulkhead 106. These small diameter flow tubes provide parallel flow paths down the interior of the reaction chamber.

FIG. 6 is an elevation view with parts broken away for clarity of presentation and shows the reaction chamber in more detail. The two parallel flow tubes 114 and 116 extend down the center of the reaction chamber to a position near the bottom of the reaction chamber 20. The bottom of each of the small diameter flow tubes 114 and 116 is provided with a downwardly opening check valve with adjustable spring force. A suitable ball check valve is useful in accordance with the invention A ball 120 and 120' sits on the lower end of the small diameter tubing and is spring loaded by a spring 121, 121' in such position. The spring is seated on and biased against collar member 122, 122' which threadably engages the lower end of the small diameter tubing. One of the small diameter flow tubes reaches closer to the bottom of the reaction chamber than the other. This longer tube is used to direct the less dangerous of the reactive fluids into the reaction chamber to lessen the likelihood of an unreacted portion of the dangerous fluid from collecting in the lower end of the tool.

A series of exhaust vent ports 22 are provided in the upper portion of the tubular reaction chamber to vent products of the reaction in the chamber to the well annulus. By causing the reaction products to move up the interior of the reaction chamber the small diameter tubes are heated to preheat the reactant fluids. The number and size of the ports will be determined by the amount of reaction products that will have to be vented.

Although certain specific embodiments of the present invention have been described in detail, the invention is not to be limited to only such embodiments but rather by the scope of the appended claims.

We claim:

1. Apparatus for use in mixing fluids in a well comprising first tubing means forming a flow path from the earth's surface down a well, second tubing means concentrically arranged around said first tubing means and extending from the earth's surface down said well, a source of a first reactant fluid connected to the upper end of said first tubing means, a source of a second reactant fluid connected to the upper end of said second tubing means, an elongated tubular reaction chamber having a closed lower end and an open upper end, means connecting the upper end of said reaction chamber with the lower end of said second tubing means, a crossover sub having two openings forming parallel flow paths therethrough located in the upper end of said reaction chamber and providing the only flow paths for flow into said reaction chamber from said first tubing means and said second tubing means, means connecting said first tubing means to the upper end of one of openings in said crossover sub, a pair of small diameter flow tubes connected to the lower ends of the openings in said crossover sub and extending in parallel relationship substantially the entire length of said reaction chamber and vent port means in the upper portion of said reaction chamber for venting reaction products from said reaction chamber to the well.

2. The apparatus of claim 1 where one of the small diameter flow tubes extends further down the reaction chamber than the other of said small diameter tubing sections.

3. The apparatus of claim 2 where check valves with adjustable spring force are connected to the small diameter flow tubes in the reaction chamber.

4. Apparatus for use in mixing $N_2H_4$ and $H_2O_2$ in a well comprising first tubing means forming a flow path for $N_2H_4$ from the earth's surface down a well, second tubing means concentrically arranged around said first tubing means and extending from the earth's surface down said well to form a flow path for $H_2O_2$, a source of a $N_2H_4$ connected to the upper end of said first tubing means, a source of $H_2O_2$ connected to the upper end of said second tubing means, an elongated tubular reaction chamber having a closed lower end and an open upper end, means connecting the upper end of said reaction chamber with the lower end of said second tubing means, a crossover sub having two openings forming parallel flow paths therethrough located in the upper end of said reaction chamber and providing the only flow paths for flow into said reaction chamber from said first and said second tubing means, means connecting said first tubing means to the upper end of one of said openings in said crossover sub, a pair of small diameter flow tubes connected to the lower ends of said openings in said crossover sub and extending substantially in parallel relationship the entire length of said reaction chamber and a vent port means in the upper portion of said reaction chamber for venting reaction products from said reaction chamber to the well.

5. The apparatus of claim 4 further characterized by downwardly opening check valves with adjustable spring force in the lower ends of said small diameter flow tubes.

* * * * *